US008620804B2

(12) United States Patent
Friedlander et al.

(10) Patent No.: US 8,620,804 B2
(45) Date of Patent: Dec. 31, 2013

(54) ALLOCATING RESEARCH FUNDING

(75) Inventors: Robert R. Friedlander, Southbury, CT (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/210,768

(22) Filed: Aug. 16, 2011

(65) Prior Publication Data

US 2013/0046680 A1 Feb. 21, 2013

(51) Int. Cl.
*G06Q 40/00* (2012.01)

(52) U.S. Cl.
USPC .......................................................... 705/39

(58) Field of Classification Search
None
See application file for complete search history.

(56) References Cited

U.S. PATENT DOCUMENTS

| 6,493,637 | B1 | 12/2002 | Steeg | |
|---|---|---|---|---|
| 7,058,581 | B1 * | 6/2006 | Young | 705/16 |
| 7,085,981 | B2 * | 8/2006 | Aggarwal | 714/738 |
| 7,516,142 | B2 | 4/2009 | Friedlander et al. | |
| 7,630,948 | B2 | 12/2009 | Friedlander et al. | |
| 7,761,440 | B2 | 7/2010 | Chow et al. | |
| 7,792,774 | B2 | 9/2010 | Friedlander et al. | |
| 7,805,391 | B2 | 9/2010 | Friedlander et al. | |
| 7,809,660 | B2 | 10/2010 | Friedlander et al. | |
| 2003/0055779 | A1 | 3/2003 | Wolf | |
| 2004/0078313 | A1 | 4/2004 | Brouillette et al. | |
| 2006/0242564 | A1 | 10/2006 | Egger et al. | |
| 2007/0094665 | A1 * | 4/2007 | Jackson | 718/104 |
| 2007/0185389 | A1 | 8/2007 | Peng et al. | |
| 2008/0162267 | A1 | 7/2008 | Wolf | |
| 2009/0187589 | A1 | 7/2009 | Zedlitz et al. | |
| 2012/0023218 | A1 * | 1/2012 | Journeau et al. | 709/223 |
| 2012/0121027 | A1 * | 5/2012 | Ahtiainen et al. | 375/259 |

OTHER PUBLICATIONS

Tyagi, Rajesh; A Computer-Based DSS for Funds Management in a Large State University Environment; Virginia Polytechnic Institute and State University; UMI Dissertations Publishing (Abstract only); (1986).*

Drews, Celia Avant; REsource Allocation and Individual Student Achievement Over Time; Tarleton State University; UMI Dissertations Publishing (Abstract only); (2008).*

Switzer, Lorne Nelson; Industrial R&D in the United States: A New Look at Determinants, Effects of Government Expenditures, and the Effects of Inflation; University of Pennsylvania; UMI Dissertations Publishing (Abstract only); (1982).*

* cited by examiner

*Primary Examiner* — Virpi Kanervo
(74) *Attorney, Agent, or Firm* — John R. Pivnichny; Law Office of Jim Boice (57) ABSTRACT

Allocation of research funding is based on changes to sizes of resource clusters. Each resource cluster is composed of a set of researchers devoted to a single aspect of a research field. A size change to a specific resource cluster indicates a change to a level of activities associated with a corresponding specific aspect of the research field. In response to identifying an under-attended aspect of the research field caused by the change in sizes of the resource clusters, a recommendation is issued to allocate additional funding for research to the under-attended aspect of the research field.

20 Claims, 5 Drawing Sheets

FIG. 1

| KNOWN ASPECT 204a (RADIOLOGY) | UNKNOWN ASPECT 206a | KNOWN ASPECT 204b (PHARMACOLOGY) |
|---|---|---|
| KNOWN ASPECT 204c (SURGERY) | KNOWN ASPECT 204d (GENETICS) | KNOWN ASPECT 204e (NUTRITION) |
| UNKNOWN ASPECT 206b | KNOWN ASPECT 204f (IMAGING) | KNOWN ASPECT 204n (CARCINOGENS) |

ALLOCATING RESEARCH FUNDING

BACKGROUND

The present disclosure relates to the field of computers, and specifically to the use of computers in the field of funding research. Still more particularly, the present disclosure relates to the use of computers in allocating research funding.

Research, including medical research, includes research in many different aspects or a particular research field. These different aspects may be similar or very disparate. For example, one aspect of medical research may be directed to studying imaging, while another may be focused on biochemistry. All such aspects require funding in order to proceed.

SUMMARY

A computer implemented method, system, and/or computer program product identify a change in sizes of resource clusters. Each resource cluster is composed of a set of researchers devoted to a single aspect of a research field, and a size change to a specific resource cluster indicates a change to a level of activities associated with a corresponding specific aspect of the research field. In response to identifying an under-attended aspect of the research field caused by the change in sizes of the resource clusters, a recommendation is issued to allocate additional funding for research to the under-attended aspect of the research field.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
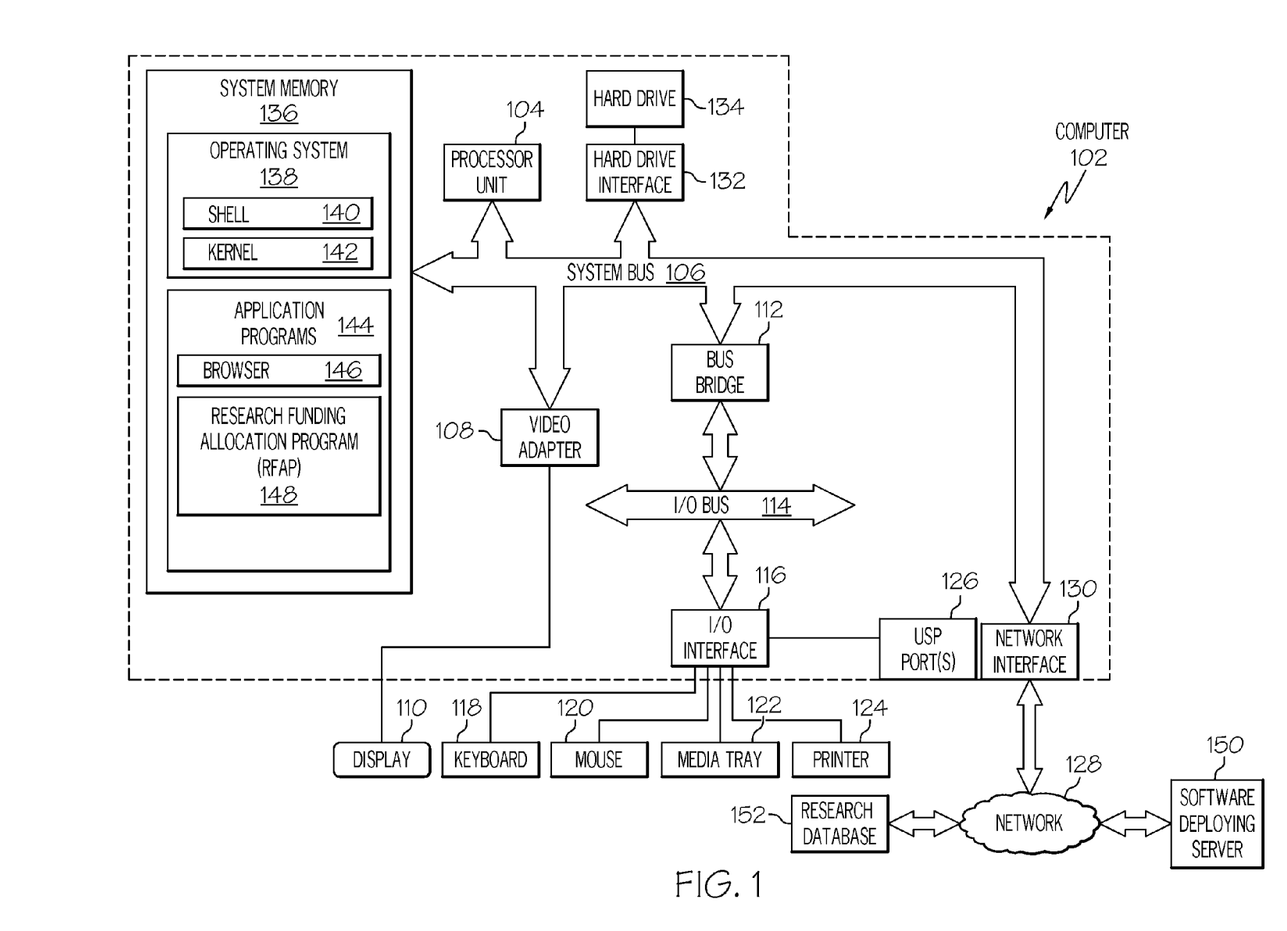
FIG. 1 depicts an exemplary computer in which the present disclosure may be implemented.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150.

Computer 102 includes a processing unit 104 that is coupled to a system bus 106. Processing unit 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 using a network interface 130. Network 128 may be an external network such as the Internet, or an internal network such as an Ethernet or a virtual private network (VPN). In one embodiment, network 128 affords access to a remote research database 152, which contains information about research areas, research topics, past and current activities in particular research topics/areas, etc.

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (and, in one embodiment, software deploying server 150's system memory) also include a research funding allocation program (RFAP) 148. RFAP 148 includes code for implementing the processes described below, including those described in FIGS. 2-5. In one embodiment, computer 102 is able to download RFAP 148 from software deploying server 150, including in an on-demand basis, wherein the code in RFAP 148 is not downloaded until needed for execution to define and/or implement the improved enterprise architecture described herein. Note further that, in one embodiment of the present invention, software deploying server 150 performs all of the functions associated with the present invention (including execution of RFAP 148), thus freeing computer 102 from having to use its own internal computing resources to execute RFAP 148.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
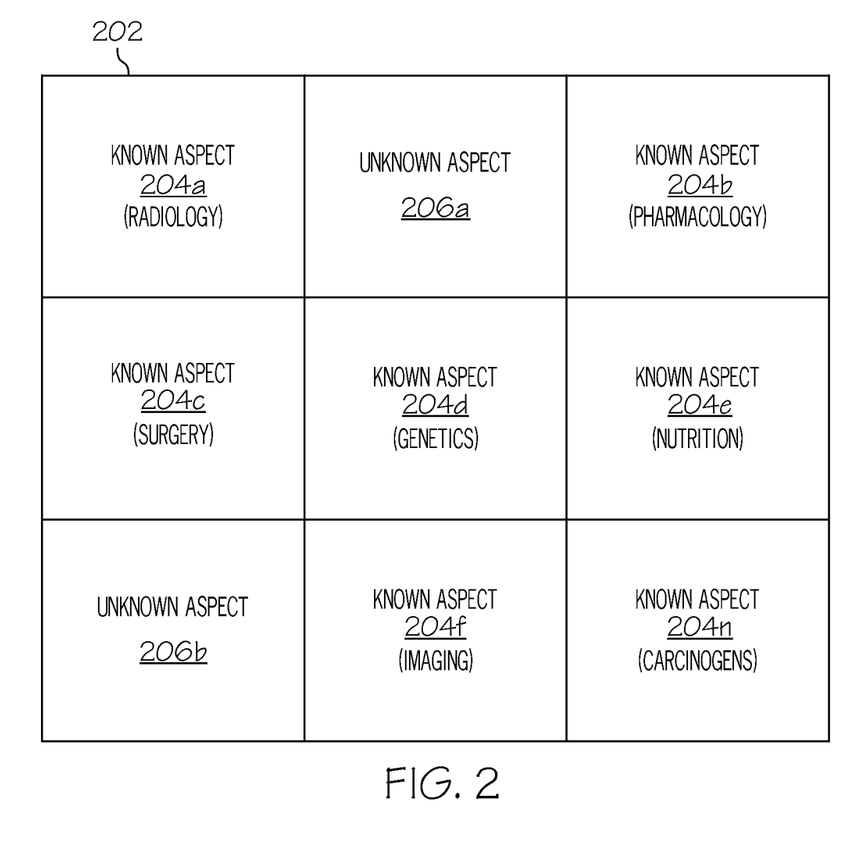
FIG. 2 illustrates an exemplary aspect map of known and unknown aspects of a research field.

With reference now to FIG. 2, an exemplary aspect map 202 of known and unknown aspects of a research field is presented. As depicted, the aspect map 202 includes both known aspects 204a-n (where "n" is an integer) of the research field as well as unknown aspects 206a-b (where "b" is also an integer") of the research field. For example, consider the exemplary research field of "cancer research". This research field includes known aspects such as research in radiology (e.g., known aspect 204a), pharmacology (e.g., known aspect 204b), surgery (e.g., known aspect 204c), genetics (e.g., known aspect 204d), nutrition (e.g., known aspect 204e), imaging (e.g., known aspect 204f), and carcinogens (e.g., known aspect 204n). That is, these areas are known to have been studied by various researchers in the past. Unknown aspects 206a-b are research areas that have not been studied. That is, certain research areas either have never been addressed, or there is no record (publications, grant proposals, etc.) of work in this area.

Figure 3:
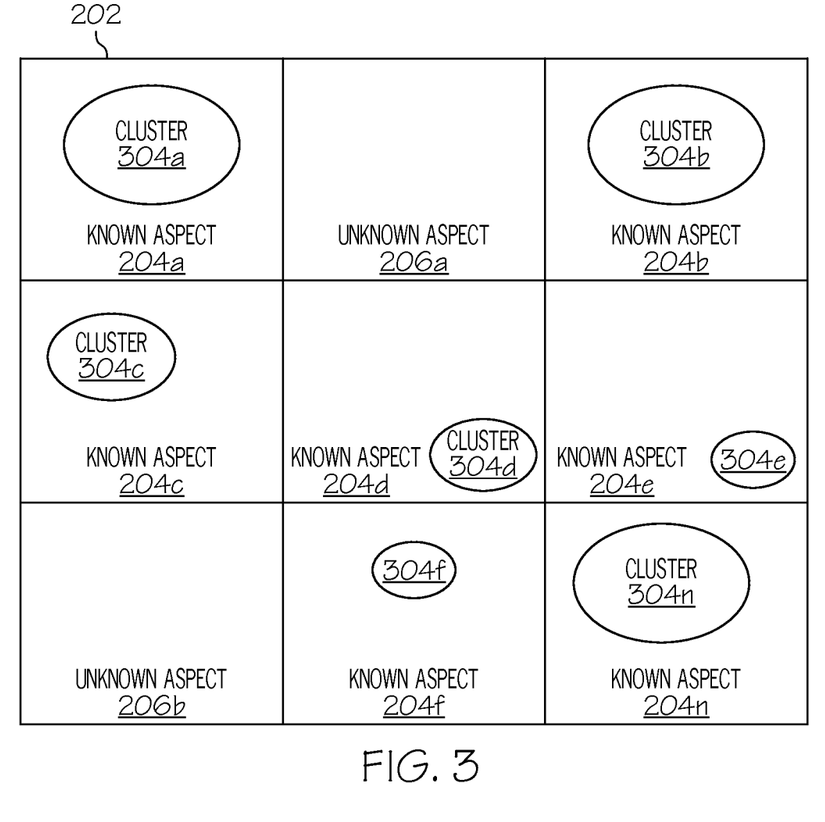
FIG. 3 depicts exemplary resource clusters being mapped to and overlaid on the aspect map shown in FIG. 2.

With reference now to FIG. 3, a cluster map of resource clusters 304a-n is then overlaid on top of the aspect map 202 shown in FIG. 2. Each of the resource clusters 304a-n represents a quantity and quality of researchers who have worked on a particular known aspect of the research field. The quantity of researchers is simply the number of professionals who are working in a particular research field, as identified by their publications, their curriculum vitae, articles describing their work, advertisements describing their work, etc. Each of these data sources is given a weighting in order to qualify the work being done in a particular area. For example, a renowned Nobel laureate researcher would be given a higher weighting than a novice laboratory technician. Similarly, research that has been peer-reviewed published in a highly prestigious magazine would be given a higher weighting than research described only in an Internet blog. Thus, the quantity and quality of research being performed in a particular research area (e.g., a known aspect from known aspects $204a$-$n$) is described by the size, shape, color, etc. of the resource cluster (e.g., one of resource clusters $304a$-$n$). In the example shown in FIG. 3, in the past there was more quality work done in the areas of radiology ($204a$) and pharmacology ($204b$) than in imaging ($204f$), as illustrated by the relative sizes of respective resource clusters $304a$, $304b$, and $304f$.

Figure 4:
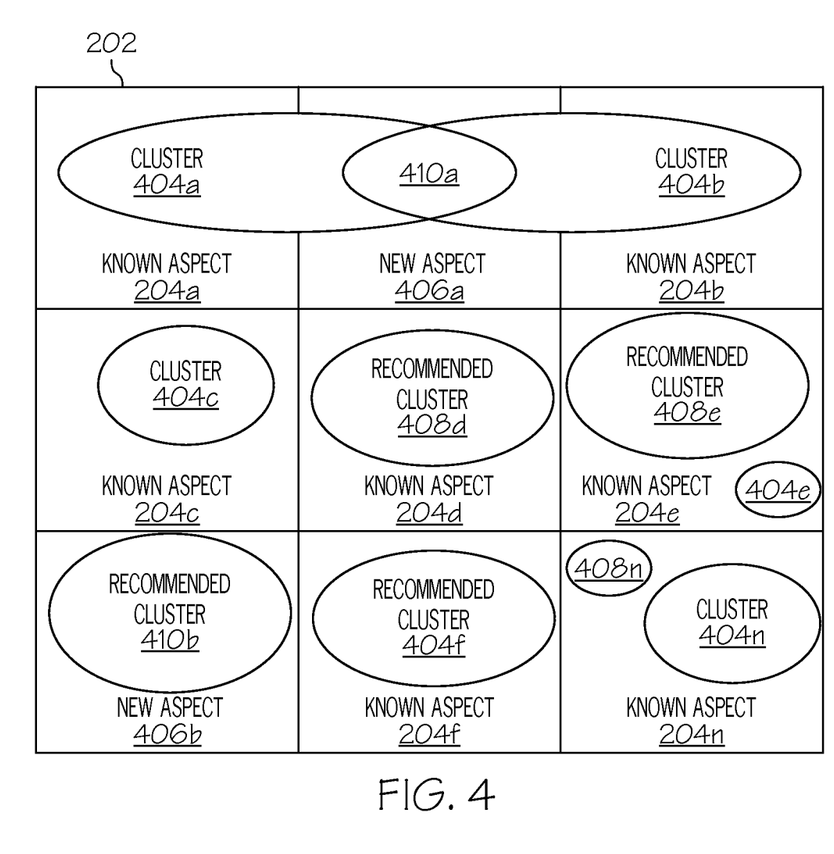
FIG. 4 illustrates changes to the resource clusters shown in FIG. 3 after a passage of time.

With reference now to FIG. 4, changes to resource clusters $304a$-$n$ are depicted after a passage of time as resource clusters $404a$-$n$. For example, assume that resource clusters $304a$-$n$ in FIG. 3 represent the quantity/quality of work done in a certain research area ten years ago. The amount of research done in these same areas is now depicted in FIG. 4 as resource clusters $404a$-$n$. The change in the size of these resource clusters presents several different scenarios and types of information that are used by the present disclosure to determine how future research resources should be allocated.

For example, consider resource clusters $404a$ and $404b$. Resource cluster $404a$ describes researchers who are working in the field of radiology while resource cluster $404b$ describes researchers who are working in the field of pharmacology. In one example, assume that workers from both resource cluster $404a$ and $404b$ are working with a same radioactive isotope in their research. However, this radioactive isotope has never been studied to determine what, if any, effect the radioactive isotope has on cancer. Thus, a recommended resource cluster $410a$ is formed, along with a recommendation to fund this research in this new aspect $406a$, in order to study the relationship of this particular radioactive isotope on cancer. Note that the recommended resource cluster $410a$ is a target size of the number of researchers to work in this area, as weighted by their credentials.

In another example, consider the work that has been done over the years on researching the effects of nutrition on cancer (known aspect $204e$). The amount of work being done in this area has remained small and unchanged over the past ten years, as depicted by the same sizes of resource cluster $304e$ in FIG. 3 and resource cluster $404e$ in FIG. 4. Assume further that a recent breakthrough has determined that a particular nutrient in a particular vegetable shows significant promise in the treatment and/or prevention of cancer. As such, a new recommended resource cluster $408e$ would be generated to address this matter. Note that the size of the recommended resource cluster $408e$ is larger than the current resource cluster $404e$, indicating that a recommendation will be made to increase funding for additional research/researchers in this aspect. In another embodiment, new techniques may have been developed in recent times (e.g., new biochemical assaying techniques, new imaging techniques, new nutritional correlating software, etc.) that were not used in nutrition studies before. However, the use of such new techniques may well provide new information, and thus the recommended resource cluster $408e$ is enlarged to encompass the necessary research/researchers to fully pursue the new course of research. Again, note that while a resource cluster represents the number of actual or recommended researchers for a particular aspect, a corresponding funding level to support these researchers and their equipment is associated with the size of the cluster. Determining that exact amount of funding is subject to fine tuning, such as adjusting the recommended funding for a more expensive aspect (e.g., imaging which has a high cost overhead for equipment) or a less expensive aspect (e.g., studying genetics, which may be done more cheaply with DNA microarray chips and high-throughput screen software, etc.).

In another example, assume that research in cancer surgery ($204c$) uses a laser, while research in cancer imaging ($204f$) uses electrons from an electron microscope. Assume further that a recent discovery has shown that both lasers and electrons have an effect on cellular reproduction. As such, a recommended resource cluster $410b$ is generated to study this effect (new aspect $406b$).

In another example, assume that nobody is currently studying the role of genetics ($204d$) in cancer (as evidenced by the lack of a resource cluster $304d$ or $404d$ in FIG. 4). Since genetics is known to be a significant factor in cancer, then a recommended resource cluster $408d$ is generated, since the resource cluster $304d$ has fallen below a predetermined level (e.g., is gone).

While the examples described above are directed to increasing funding to different aspects of the research, there may be situations in which funding should be cut back. Thus, recommended resource cluster $408n$ is smaller than the current actual resource cluster $404n$.

As used herein, the term "under-attended" is defined as a descriptor for a research aspect that is not receiving adequate funding and is not the subject of adequate levels of research activities. The determination as to which research aspects are under-attended is made using the techniques and mappings described herein.

Figure 5:
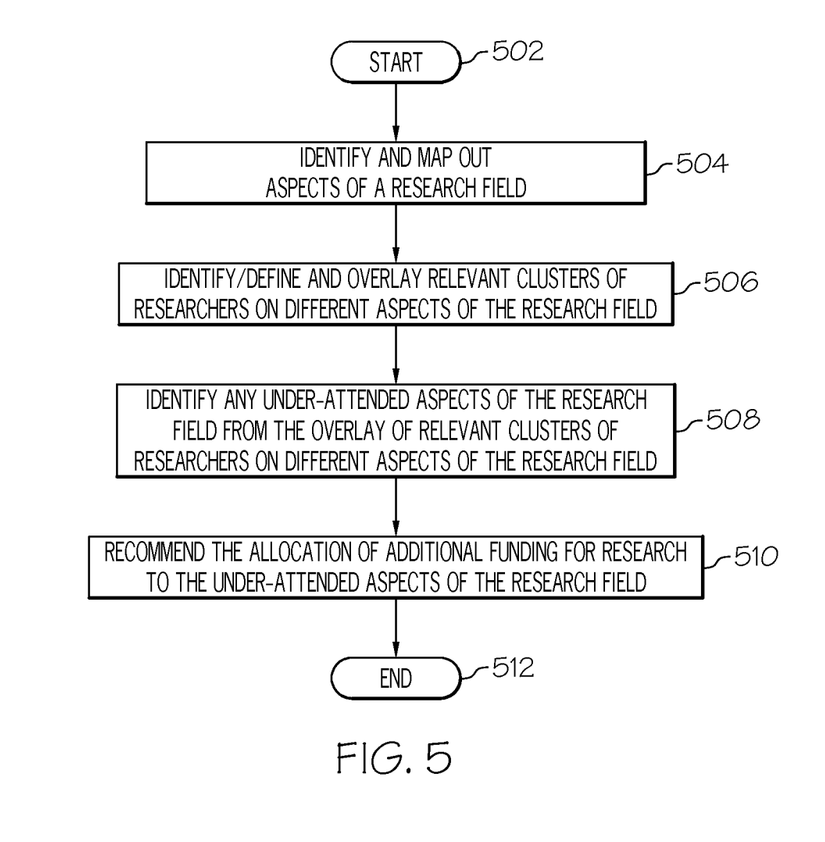
FIG. 5 is a high level flow chart of one or more activities performed by a processor to aid in the allocation of research funding based on an overlaid map such as the overlaid map shown in FIG. 4.

With reference now to FIG. 5, a high level flow chart of one or more activities performed by a processor to aid in the allocation of research funding based on an overlaid map such as the overlaid map shown in FIG. 4 is presented. After initiator block 502, which may be prompted by a passage of a predetermined period of time, known aspects of a research field are identified and mapped out (block 504), as shown in exemplary manner in FIG. 2. As described in block 506, relevant resource clusters of researchers are identified/defined according to the quantity and quality of efforts being exerted on a particular aspect of the research area. These resource clusters are represented as visualized resource cluster, and are then overlaid on the different aspects of the research field depicted in the map generated in block 504, as shown in exemplary manner in FIGS. 3-4. When one or more resource clusters of researchers in a particular aspect of the research field change (i.e., become smaller, larger, merge, or otherwise move), this change will result in a particular aspect of the research field becoming under-attended (block 508). That is, if a particular aspect was receiving much attention in the past by researchers, but research trends result in that particular aspect no longer being studied (e.g., known aspect $204d$ described above) or not keeping up with recent discoveries (e.g., known aspect $204e$ described above), then a recommendation may be generated to allocate additional funding for research to that under-attended aspect of the research field (block 510). Contrarily, if a particular aspect of a research field is being over-attended (e.g., known aspect $204n$ described above), then a recommendation is made to reduce previously allocated funding to this over-attended aspect of the research field.

Returning to block 506, the relevant resource clusters that were overlaid on the map of aspects of the research field may have been skewed by a funding level that exceeds some predetermined level. For example, assume that for political reasons, a particular aspect of research was allocated a particularly large amount of grant money in the past. This would likely result in an increase in grant requests being approved, and thus a "bloom" in a particular resource cluster. However, if data mining reveals that the information derived from such research was minimal, if not inconsequential, to the further understanding of the research field, then the aspect that was the beneficiary of such as windfall is filtered out, in order to avoid skewing the identification of changes in sizes of resource clusters.

Returning to block 508, one type of under-attended aspect of the research field is a previously unknown aspect, such as unknown aspects 206a-b shown in FIG. 2. As described herein, however, if two resource clusters have a common feature (e.g., resource cluster 304a and resource cluster 304b both use a same radioactive isotope, as described above), then the processor will issue a recommendation to allocate funding to this new aspect of the research field (block 510). Similarly, if two aspects have different features (e.g., resource cluster 404c uses lasers while resource cluster 404f uses electrons, as described above), but a new feature (e.g., the effect of lasers and electrons on cellular grown) is identified as being related to both of the different features from resource clusters 404c and 404f, then a new aspect of the research field is created, and a recommendation is issued to fund this new aspect (again block 510).

Still referring to block 508, some under-attended aspects of the research field are identified as the non-use or under-utilization of a particular technology, which may have been recently developed. Thus, in one embodiment a recommendation is made to increase funding to utilize the unused (or underutilized) technology in this under-attended aspect of the research field (also block 510).

The process ends at terminator block 512.

Note that some or all of the information about new developments and techniques, work descriptions of research in an aspect of the research field, scaling/grading of various publications/positions/experience/etc. of various researchers, etc. as described above, may be mined from the research database 152 shown in FIG. 1, for use in generating the resource clusters described herein as well as identifying new aspects, recommending new resource clusters, etc.

As described herein, the present invention provides a new and useful process for allocating research funding to various research aspects based on the change in weighted size of resource clusters of researchers working in these research aspects. The process described herein utilizes data mining to accurately describe what level (quantity and quality) of work is being done in each area, in order to increase funding to under-attended research areas while cutting back funding in over-attended research areas. The process also creates new aspects of research for future working areas. Note that this greatly improves the process of funding research, which heretofore has often followed a herd mentality. That is, prior to the process described herein, research funding followed fads, trends, popularity, etc., rather than identifying where resources are truly needed. The present invention addresses this need by utilizing the processes described herein.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the invention of the present application in detail and by reference to illustrative embodiments thereof, it will be apparent that modifications and variations are possible without departing from the scope of the invention defined in the appended claims.

What is claimed is:

1. A computer implemented method of allocating research funding, the computer implemented method comprising:

identifying, by a processor, a change in sizes of resource clusters, wherein each resource cluster is composed of a set of researchers devoted to a single aspect of a research field, wherein each resource cluster represents a quantity and quality of researchers who have worked on the single aspect of the research field, and wherein a size change to a specific resource cluster indicates a change to a level of activities associated with a corresponding specific aspect of the research field; and issuing, by the processor, a recommendation to allocate additional funding for research to an under-attended aspect of the research field in response to identifying the under-attended aspect of the research field by the change in sizes of the resource clusters, wherein the under-attended aspect of the research field is a research aspect that is not receiving adequate funding and is not a subject of adequate levels of research activities.

2. The computer implemented method of claim 1, further comprising:
   identifying, by the processor, the under-attended aspect of the research field by determining that a size of a particular resource cluster associated with the under-attended aspect of the research field is below a predetermined level.

3. The computer implemented method of claim 1, further comprising:
   identifying, by the processor, an over-attended aspect of the research field based on a funding level, for a specific aspect of the research field, that exceeds a predetermined level; and
   in response to identifying the over-attended aspect of the research field, issuing, by the processor, a recommendation to reduce previously allocated funding to the over-attended aspect of the research field.

4. The computer implemented method of claim 1, further comprising:
   identifying, by the processor, a new aspect of the research field by identifying common features of two of the resource clusters; and
   issuing, by the processor, a recommendation to allocate funding to the new aspect of the research field.

5. The computer implemented method of claim 1, further comprising:
   identifying, by the processor, a new aspect of the research field by identifying a new feature that is related to a first known feature of an activity of a first resource cluster and to a second known feature of an activity of a second resource cluster; and
   issuing, by the processor, a recommendation to allocate funding to the new aspect of the research field.

6. The computer implemented method of claim 1, further comprising:
   identifying, by the processor, a funding level, for a specific aspect of the research field, that exceeds a predetermined level; and
   filtering out, by the processor, a specific resource cluster during said identifying the change in sizes of resource clusters, wherein said specific resource cluster is associated with the specific aspect that received the identified funding level.

7. The computer implemented method of claim 1, further comprising:
   identifying, by the processor, technology that has been unused with the under-attended aspect of the research field; and
   issuing, by the processor, a recommendation to increase funding to utilize the unused technology with the under-attended aspect of the research field.

8. A computer program product for allocating research funding, the computer program product embodied in a non-transitory computer readable storage medium that when executed by a processor causes the processor to:
   identify a change in sizes of resource clusters, wherein each resource cluster is composed of a set of researchers devoted to a single aspect of a research field, wherein each resource cluster represents a quantity and quality of researchers who have worked on the single aspect of the research field, and wherein a size change to a specific resource cluster indicates a change to a level of activities associated with a corresponding specific aspect of the research field; and
   issue a recommendation to allocate additional funding for research to an under-attended aspect of the research field in response to identifying the under-attended aspect of the research field by the change in sizes of the resource clusters, wherein the under-attended aspect of the research field is a research aspect that is not receiving adequate funding and is not a subject of adequate levels of research activities.

9. The computer program product of claim 8, wherein the computer program product embodied in the non-transitory computer readable storage medium, when executed by a processor, further causes the processor to:
   identify the under-attended aspect of the research field by determining that a size of a particular resource cluster associated with the under-attended aspect of the research field is below a predetermined level.

10. The computer program product of claim 8, wherein the computer program product embodied in the non-transitory computer readable storage medium, when executed by a processor, further causes the processor to:
    identify an over-attended aspect of the research field based on a funding level, for a specific aspect of the research field, that exceeds a predetermined level; and
    in response to identifying the over-attended aspect of the research field, issue a recommendation to reduce previously allocated funding to the over-attended aspect of the research field.

11. The computer program product of claim 8, wherein the computer program product embodied in the non-transitory computer readable storage medium, when executed by a processor, further causes the processor to:
    identify a new aspect of the research field by identifying common features of two of the resource clusters; and
    issue a recommendation to allocate funding to the new aspect of the research field.

12. The computer program product of claim 8, wherein the computer program product embodied in the non-transitory computer readable storage medium, when executed by a processor, further causes the processor to:
    identify a new aspect of the research field by identifying a new feature that is related to a first known feature of an activity of a first resource cluster and to a second known feature of an activity of a second resource cluster; and
    issue a recommendation to allocate funding to the new aspect of the research field.

13. The computer program product of claim 8, wherein the computer program product embodied in the non-transitory computer readable storage medium, when executed by a processor, further causes the processor to:
    identify a funding level, for a specific aspect of the research field, that exceeds a predetermined level; and
    filter out a specific resource cluster during said identifying the change in sizes of resource clusters, wherein said specific resource cluster is associated with the specific aspect that received the identified funding level.

14. The computer program product of claim 8, wherein the computer program product embodied in the non-transitory computer readable storage medium, when executed by a processor, further causes the processor to:
    identify technology that has been unused with the under-attended aspect of the research field; and
    issue a recommendation to increase funding to utilize the unused technology with the under-attended aspect of the research field.

15. A computer system comprising:
    a processor;
    a computer readable memory; and
    a computer readable storage medium containing instructions that when executed by a processor causes the processor to:

identify a change in sizes of resource clusters, wherein each resource cluster is composed of a set of researchers devoted to a single aspect of a research field, wherein each resource cluster represents a quantity of researchers who have worked on the single aspect of the research field, and wherein a size change to a specific resource cluster indicates a change to a level of activities associated with a corresponding specific aspect of the research field; and issue a recommendation to allocate additional funding for research to an under-attended aspect of the research field in response to identifying an under-attended aspect of the research field by the change in sizes of the resource clusters, wherein the under-attended aspect of the research field is a research aspect that is not receiving adequate funding and is not a subject of adequate levels of research activities.

16. The computer system of claim 15, wherein the instructions, when executed by the processor, further cause the processor to:

identify the under-attended aspect of the research field by determining that a size of a particular resource cluster associated with the under-attended aspect of the research field is below a predetermined level.

17. The computer system of claim 15, wherein the instructions, when executed by the processor, further cause the processor to:

identify an over-attended aspect of the research field based on a funding level, for a specific aspect of the research field, that exceeds a predetermined level; and in response to identifying the over-attended aspect of the research field, issue a recommendation to reduce previously allocated funding to the over-attended aspect of the research field.

18. The computer system of claim 15, wherein the instructions, when executed by the processor, further cause the processor to:

identify a new aspect of the research field by identifying common features of two of the resource clusters; and issue a recommendation to allocate funding to the new aspect of the research field.

19. The computer system of claim 15, wherein the instructions, when executed by the processor, further cause the processor to:

identify a funding level, for a specific aspect of the research field, that exceeds a predetermined level; and filter out a specific resource cluster during said identifying the change in sizes of resource clusters, wherein said specific resource cluster is associated with the specific aspect that received the identified funding level.

20. The computer system of claim 15, wherein the instructions, when executed by the processor, further cause the processor to:

identify technology that has been unused with the under-attended aspect of the research field; and issue a recommendation to increase funding to utilize the unused technology with the under-attended aspect of the research field.

* * * * *